US005907461A

United States Patent [19]

Hartzel et al.

[11] Patent Number: 5,907,461

[45] Date of Patent: May 25, 1999

[54] MOLDED CASE CIRCUIT BREAKER WITH GROUND FAULT PROTECTION AND SIGNALING SWITCHES

[75] Inventors: Ronald Dale Hartzel, Butler; Keith Lynn Mayhood, Pittsburgh; William David Munsch, Pittsburgh; John Joseph Kurtz, Pittsburgh; Richard Edwin White, Beaver, all of Pa.

[73] Assignee: Eaton Corporation, Cleveland, Ohio

[21] Appl. No.: 08/942,180

[22] Filed: Oct. 1, 1997

[51] Int. Cl.$^{6}$ ....................................................... H02H 3/00

[52] U.S. Cl. ............................... 361/42; 361/115; 335/18

[58] Field of Search .................................... 361/102, 115, 361/42–50; 335/18, 23, 132

[56] References Cited

U.S. PATENT DOCUMENTS

| | | | |
|---|---|---|---|
| 3,636,482 | 1/1972 | Edmunds | 335/6 |
| 3,958,197 | 5/1976 | Gryctko | 335/18 |
| 4,281,359 | 7/1981 | Bayer et al. | 361/115 |
| 4,568,899 | 2/1986 | May et al. | 335/18 |
| 4,620,076 | 10/1986 | Mrenna et al. | 200/304 |
| 4,641,216 | 2/1987 | Morris et al. | 361/45 |
| 4,641,217 | 2/1987 | Morris et al. | 361/45 |
| 4,794,356 | 12/1988 | Yu et al. | 335/13 |
| 4,831,221 | 5/1989 | Yu et al. | 200/553 |
| 4,912,439 | 3/1990 | Nagy et al. | 335/132 |
| 4,939,490 | 7/1990 | Bernier et al. | 335/17 |
| 5,260,676 | 11/1993 | Patel et al. | 335/18 |
| 5,414,395 | 5/1995 | Garnto et al. | 335/18 |

*Primary Examiner*—Jeffrey Gaffin
*Assistant Examiner*—Michael J. Sherry
*Attorney, Agent, or Firm*—Martin J. Moran

[57] ABSTRACT

A molded case circuit breaker is provided with ground fault protection by a modular unit which drops into a pole compartment in the molded casing in place of a pole assembly. The modular unit includes a housing forming an open faced cavity across which is mounted a printed circuit board with the ground fault circuit components and trip solenoid projecting into the cavity. The housing also supports the ground fault sensing toroid in a position for the appropriate conductors to pass through the coil. A bell switch and auxiliary switch are positioned by the housing for actuation by levers mounted on the cradle pin and crossbar, respectively. An integral leaf spring molded into the housing accommodates for manufacturing tolerances and fixes the positions of the various components.

16 Claims, 5 Drawing Sheets

FIG.5
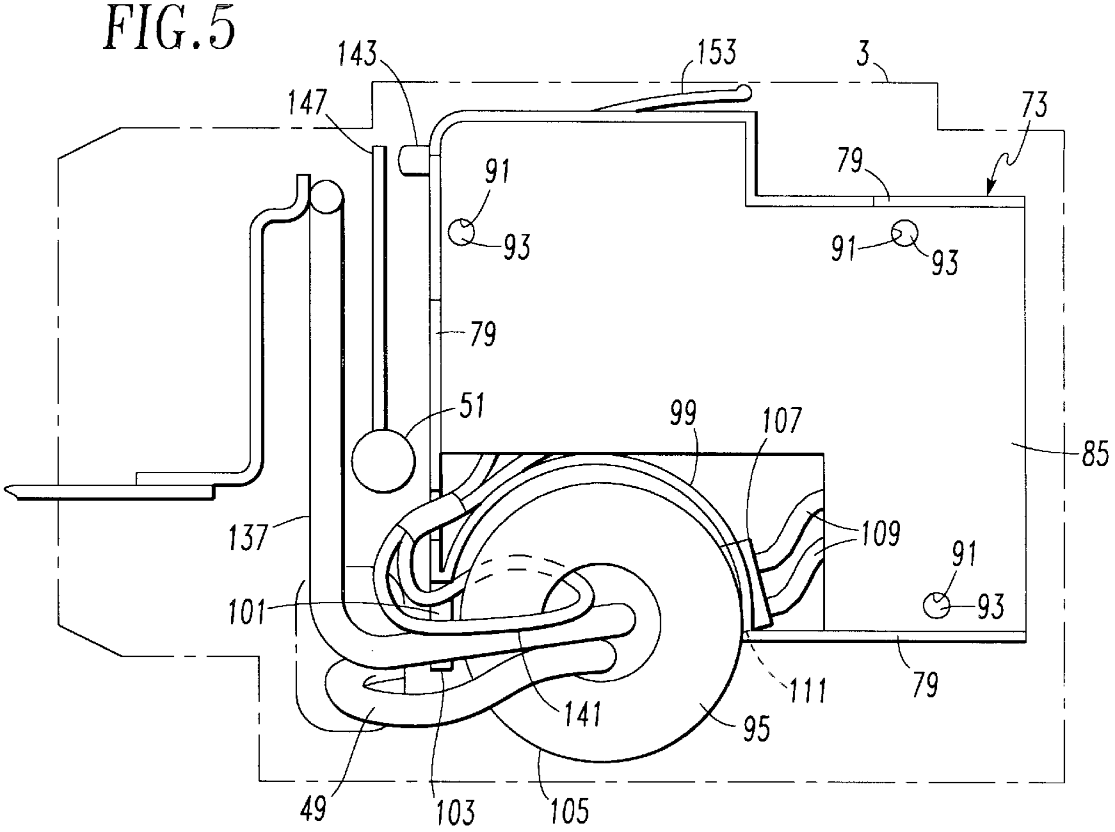
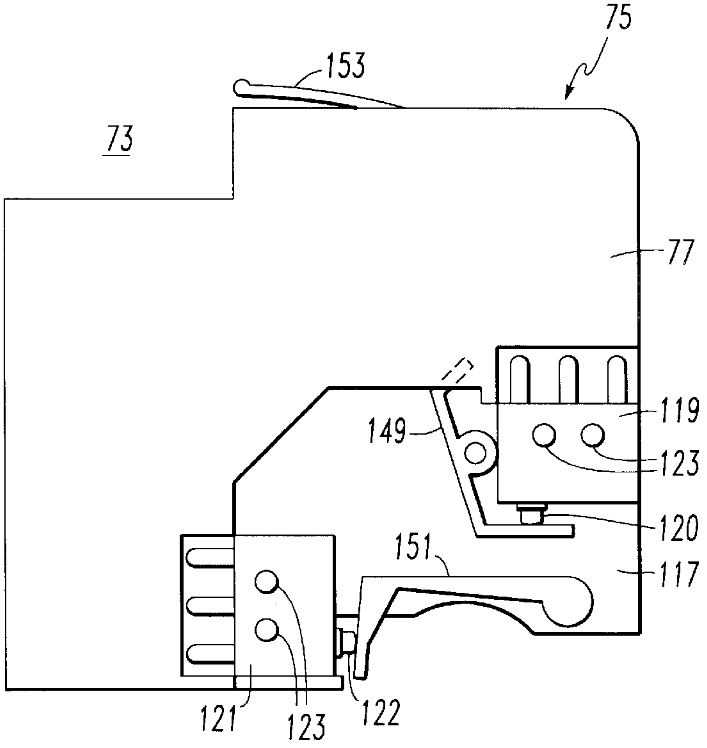
FIG.6

MOLDED CASE CIRCUIT BREAKER WITH GROUND FAULT PROTECTION AND SIGNALING SWITCHES

BACKGROUND OF THE INVENTION

1. Field of the Invention

This invention relates to molded case circuit breakers, and more particularly, to a molded case circuit breaker provided with ground fault protection and signaling switches incorporated into a modular unit insertable into the circuit breaker molded case.

2. Background Information

Molded case circuit breakers for light to medium industrial and commercial applications have a case molded from an electrically insulative resin. Such circuit breakers can be single pole or multi-pole. In the latter case, the multiple poles are housed in side-by-side compartments formed in the molded case. Each pole has a trip device which actuates a common trip bar in response to over current conditions. The common trip bar unlatches a latchable spring powered operating mechanism which through a common crossbar opens the contacts in each pole to interrupt all phases of load current.

It is common to provide ground fault protection in the smaller residential circuit breakers also known as miniature circuit breakers. A common ground fault circuit used in such applications includes a toroidal coil for differential current sensing. Both the line and neutral leads are passed through the sensing coil. Normally the currents in the leads are equal and opposite, but a ground fault causes an imbalance which generates a signal in the winding of the toroidal coil. This signal is processed, typically by circuitry implemented on a printed circuit board, and energizes a solenoid which actuates the trip mechanism. The purpose of the ground fault detector in residential circuit breakers is to protect persons from electrical shocks and the accepted level for tripping is 5 ma of ground fault current.

In industrial applications, ground fault detection is provided to protect the equipment serviced by the circuit breakers. The threshold for protection in these applications is typically 30 ma. Such equipment protection has not been provided in molded case circuit breakers in this country, although it is in use in similar circuit breakers in Europe. There is an interest now in providing similar capability in domestic molded case circuit breakers.

It is common to provide remote signalling switches in molded case circuit breakers. Typically, the switches are of two types: auxiliary switches which provide an indication of the state of the contacts, open or closed, and bell alarms which provide a signal indicating that the circuit breaker has tripped. Such switches are commonly separately mounted inside the circuit breaker molded case.

There is a need therefore for a molded case circuit breaker having ground fault protection and in particular ground fault protection for equipment.

There is a related need for ground fault protection which can be added to a molded case circuit breaker with minimum modification of the existing breaker design.

There is also a need for such ground fault protection which can be selectively provided without undue additional manufacturing costs or time.

There is a further need for such ground fault protection which can be implemented easily together with remote signalling switches such as auxiliary switches and bell alarms.

There is an additional need for an arrangement which is flexible enough to allow for varied customer requirements for ground fault protection and remote signaling.

SUMMARY OF THE INVENTION

These needs and others are satisfied by the invention which is directed to a modular unit and a molded case circuit breaker having a compartment in which the modular unit can be inserted. The modular unit includes a printed circuit board having ground fault circuitry and a trip solenoid, a toroidal coil, and a housing which carries the printed circuit board and the toroidal coil. This modular unit is insertable into the compartment of the molded case circuit breaker to position the trip solenoid for engaging and actuating the circuit breaker trip bar when the ground fault detection circuitry detects a ground fault and energizes the solenoid. The housing also positions the toroidal coil for passage of the line shunt and neural lead through the coil. Where desired, the housing can also carry signaling switches such as an auxiliary switch and or a bell alarm switch. The switches are also mounted on the housing so that they are positioned when the modular unit is inserted in the molded case circuit breaker compartment such that they are engaged by associated actuators on the circuit breaker operating mechanism.

In a preferred form of the invention, the housing is molded from a resilient resin and has an integral leaf spring which fixes the position of the components within the compartment when the cover for the molded case is in place. Also, the housing has a base member and transverse walls extending from the base member which form an open face cavity. The printed circuit board is mounted in the open face with the ground fault circuitry and trip solenoid contained within the cavity. The housing also includes an arcuate recess in which the toroidal coil is retained. This recess extends transversely through the housing and is formed in part by an arcuate transverse wall section and a cantilevered finger which together enclose at least 180° of the toroidal coil. The housing also preferably includes a switch recess in an outer surface in which the signaling switches are mounted for operation by the operating mechanism. In addition, the arcuate transverse wall section partially forming the recess for the toroidal coil has an opening into the cavity in which is seated a radially extending boss on the toroid through which the coil leads extend into the cavity within the housing for connection to the ground fault circuitry on the printed circuit board. Furthermore, a transverse partition spaced from the arcuate transverse wall section in the cavity forms therewith a wiring channel.

BRIEF DESCRIPTION OF THE DRAWINGS

A full understanding of the invention can be gained from the following description of the preferred embodiments when read in conjunction with the accompanying drawings in which:

FIG. 5 is an elevation view of the module with a toroidal sensing coil in place within the module showing the sensing leads and the general positioning of the module within the circuit breaker.

FIG. 6 is a back elevation view of the module with a pair of signaling switches installed and illustrating operation of the switches by actuators which form part of the circuit breaker.

DESCRIPTION OF THE PREFERRED EMBODIMENTS

Figure 1:
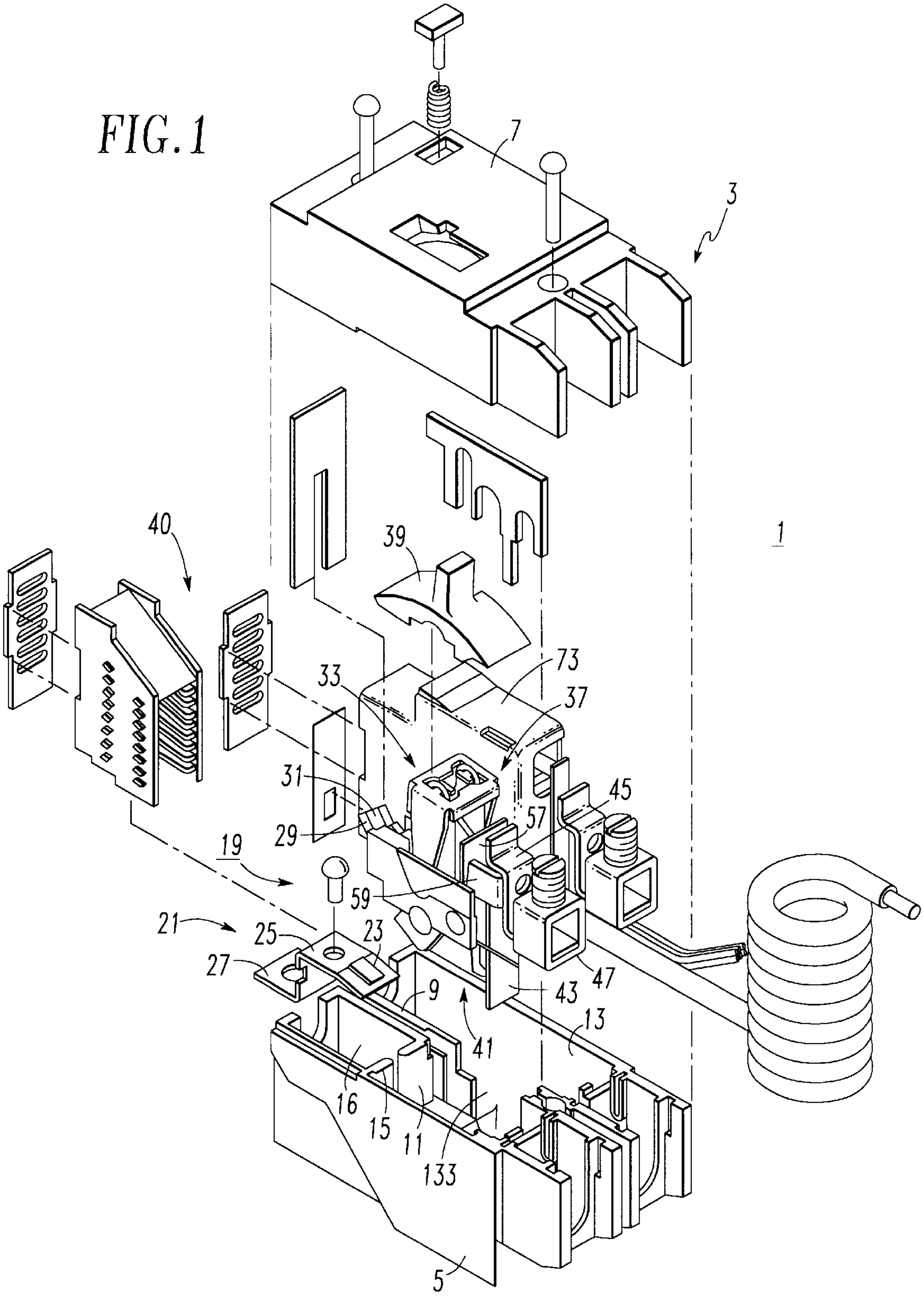
FIG. 1 is an exploded isometric view of a molded case circuit breaker incorporating the invention.

Referring to FIG. 1, a circuit breaker 1 incorporating the invention has a molded case 3 which includes a base 5 and a cover 7 molded from an insulative resin. The basic circuit breaker is of the type such as that described in U.S. Pat. No. 4,620,076 which is hereby incorporated by reference. The molded base 5 has a central partition 9 dividing the base into two side-by-side compartments 11 and 13 suitable for housing the poles of a two-pole circuit breaker. A slotted transverse partition 15 forms an arc chamber 16 within the compartment 11. In accordance with the present invention, the base 5 is modified to accommodate the ground fault circuit and the signaling switches which replace one of the poles so that the circuit breaker 1 becomes a single pole circuit breaker with ground fault protection and signaling. To that end the compartment 13 does not have a transverse wall corresponding to the wall 15.

Figure 2:
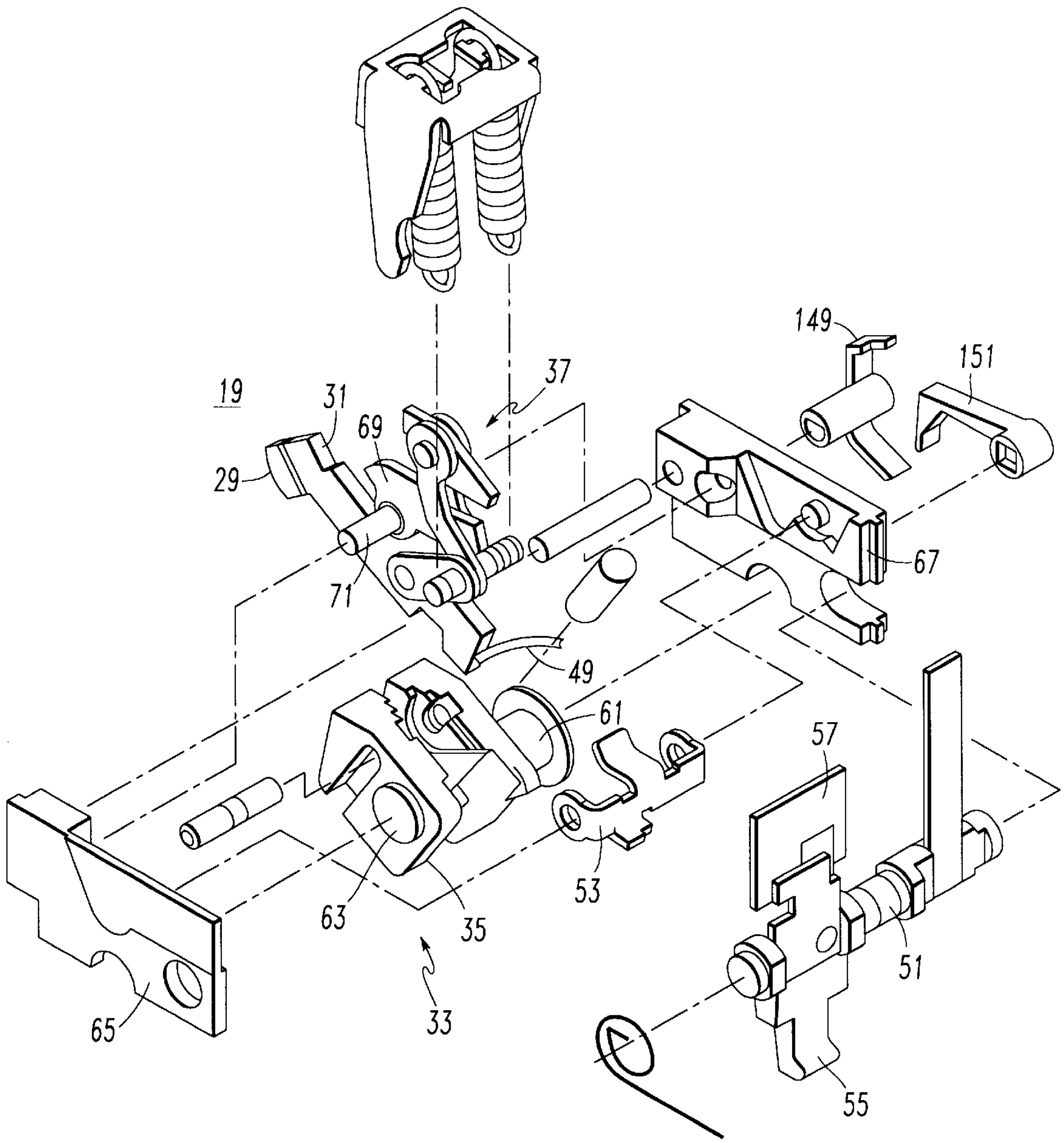
FIG. 2 is an exploded isometric view of a pole which forms part of the circuit breaker of FIG. 1.
Figure 3:
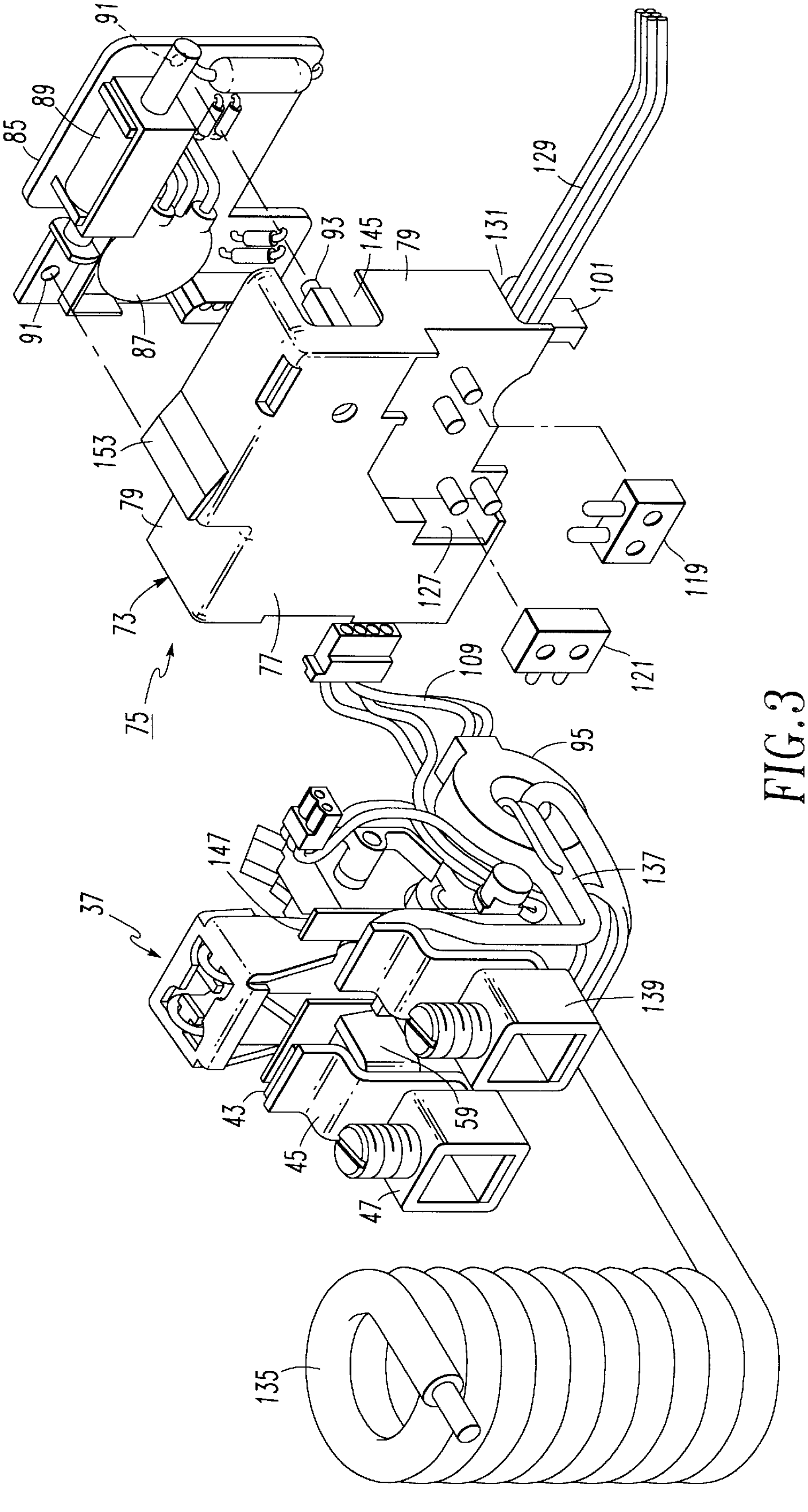
FIG. 3 is an exploded isometric view of a drop in module and its cooperating components of the circuit breaker.
Figure 4:
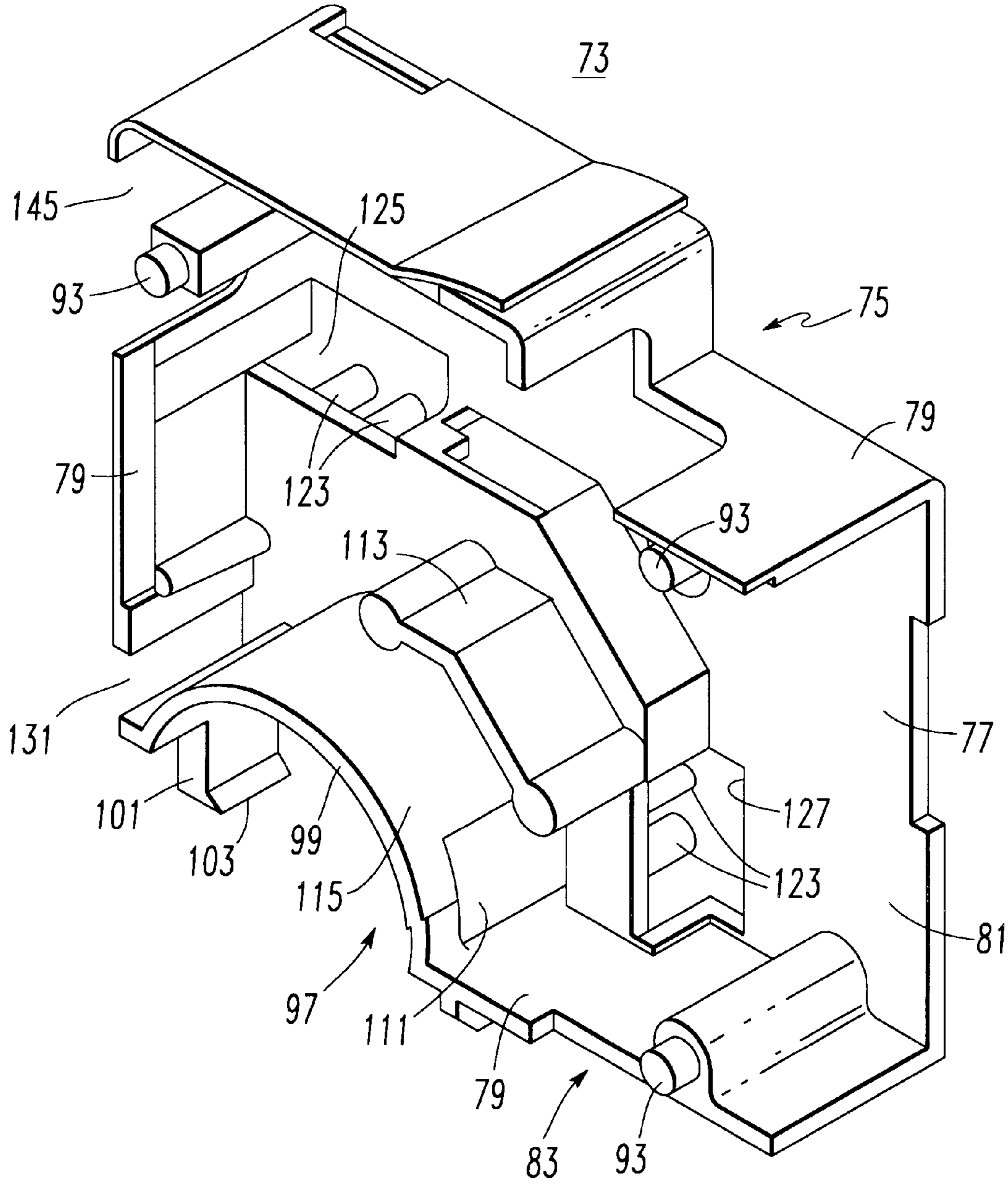
FIG. 4 is an isometric view of the housing of the drop in module.

The single pole 19 includes separable contacts 21 comprising a stationary contact 23 mounted in the arc chamber 16 on one end of a line conductor 25, the other end of which forms a line terminal 27. The separable contacts 21 also include a movable contact 29 secured to the free end of a contact arm 31 which forms part of the moving conductor assembly 33. As best seen in FIG. 2, the moving conductor assembly 33 includes a contact arm carrier 35 which pivotally mounts the contact arm 31 for opening and closing the separable contacts 21. The moving conductor assembly 33 is pivoted by a spring powered operating mechanism 37 of a type which is well known in the art. A handle 39 of the operating mechanism 37 can be used to manually open and close the separable contacts 21. See FIG. 1. The pole 19 also includes an arc chute assembly 40 received in arc chamber 16 for breaking up arcs formed when the separable contacts interrupt high currents.

The circuit breaker 1 also has a thermal-magnetic trip unit 41 which includes a bimetal 43 secured at its upper end to one end of a load conductor 45. The other end of the load conductor 45 supports a collar assembly 47 forming a load terminal. A shunt 49 electrically connects the contact arm to the free end of the bimetal 43 to complete the electrical circuit through the circuit breaker 1. The trip unit 41 further includes a rotatably mounted trip bar 51 which engages a latch 53 on the operating mechanism 37. The trip bar 51 also has a depending thermal trip arm 55 which terminates adjacent the free end of the bimetal 43. A persistent overcurrent heats up the bimetal 43 which bends and engages the trip arm 55 to unlatch the operating mechanism 37 and open the separable contacts 21.

The magnetic trip function is provided by an armature 57 mounted on the trip bar. This armature is attracted toward the bimetal by the magnetic field generated by a short circuit current flowing through the bimetal 43 and focused by a magnetic yoke 59. This also rotates the trip bar 51 to unlatch the operating mechanism 37 and open the separable contacts 21.

The contact arm carrier 35 is pivotally mounted in the base by a crossbar 61 and pivot 63 which are held in place by side plates 65 and 67. The operating mechanism 37 includes a cradle 69 which is pivotally supported by a cradle pin 71 journalled in apertures in the side plates 65 and 67. The cradle 69 and the cradle pin 71 rotate when the circuit breaker is tripped. As will be seen, this rotation is used to provide an indication that the circuit breaker has tripped.

Ground fault protection is provided in the circuit breaker 1 by a drop in modular unit 73 which is shown in FIGS. 3–6. The drop in modular unit 73 includes a housing 75. This housing 75 has a planar base 77 and transverse walls 79 extending from the base substantially around three sides of the base to form a cavity 81 with an open face 83. The drop in modular unit 73 further includes a printed circuit board (PCB) 85 on which is mounted the ground fault circuitry 87 and a trip solenoid 89. The PCB 85 has apertures 91 which engage pins 93 molded into the housing for mounting the PCB in the open face 83 of the housing with the ground fault circuitry 87 projecting into the cavity 81. Such ground fault circuitry is well known and can include a toroidal sensing coil 95. This toroidal coil 95 is retained in an arcuate recess 97 formed in the housing, in part, by an arcuate transverse wall section 99. The arcuate recess 97 is further formed by a cantilevered, integrally molded finger 101 having a radially inwardly directed rib 103 which engages a peripheral surface 105 on the toroidal coil. The arcuate recess 97 formed by the arcuate wall 99 and cantilevered finger 101 extends at least 180° around the toroidal coil to retain it within the recess. The toroidal coil 95 has a radially outwardly projecting boss 107 through which the coil electrical leads 109 extend. The arcuate wall section 99 has an opening 111 sized to receive the boss 107 so that the leads 109 extend into the cavity 81 for connecting to the ground fault circuitry 87 on the PCB 85. The cantilevered integrally molded finger 101 is substantially diametrically opposite the opening 111 to thereby retain the boss 107 in engagement with the opening.

The housing 75 includes an additional transverse partition 113 spaced from the arcuate wall section 99 to form a wiring channel 115 which guides wiring to be discussed.

The back face of the housing base 77 forms a switch recess 117 in which are mounted a pair of signaling switches including a bell switch 119 which provides an indication of whether the circuit breaker is tripped, and an auxiliary switch 121 which provides an indication of whether the separable contacts are open or closed. The microswitches are secured to the housing by pins 123 which engage apertures in the switches. The switches project through openings 125, 127, respectively, so the switch wiring 129 extends into the cavity 81. This wiring 129 is then directed through the wiring channel 115 and exits through the opening 131 in the front of the housing.

The assembled modular unit 73 with the PCB 85, trip solenoid 89, toroidal coil 95 and switches 119 and 121 in place is dropped into the compartment 13 in the base 5. When in place, the toroidal coil 95 is aligned with an opening 133 (see FIG. 1) in the partition 9 so that the shunt 49 extending between the contact arm 31 and the bimetal 43 loops through the coil 95. A neutral pigtail 135 also extends through the toroidal coil and is connected through a neutral conductor 137 to the neutral collar assembly 139. In addition, a sensing lead 141 from the ground fault circuitry 87 extends from the PCB 85 through the wiring channel 115 and the opening 131, loops through the coil 95 and reverses direction back to the printed circuit board. When the ground fault circuitry 87 detects a ground fault, the solenoid 89 is energized causing the solenoid plunger 143 to extend through an opening 145 in the housing and rotate a ground fault trip arm 147 mounted on the trip bar 51 to trip the circuit breaker open.

The bell switch 119 is actuated by an actuator or lever 149 mounted on the cradle pin 71 which depresses a plunger 120 on the switch as the cradle is rotated during a trip (see FIGS. 2 and 6). In a similar manner, the auxiliary switch 121 is actuated by another actuator or lever 151 mounted on the crossbar 61 which depresses the plunger 122 when the moving contact assembly pivots to the open position of the separable contacts. Both the bell switch 119 and the auxiliary switch 121 have a normally open and a normally closed set of contacts for providing alternative output signals. The leads 129 for the switches exit the circuit breaker housing next to the neutral pigtail 135.

In order to accommodate for tolerances and firmly fix the position of the housing 75, and therefore the various components, a leaf spring 153 is molded into the top of the housing 75 and bears against the cover 7 when the circuit breaker is fully assembled.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A molded case circuit breaker with ground fault protection comprising:

a molded case having a base with side-by-side first and second compartments and a cover mating with said base and enclosing said first and second compartments;

a pole assembly mounted in said first compartment and comprising separable contacts including a stationary contact and a movable contact, a moving conductor assembly on which said moveable contact is mounted, a latchable spring powered operating mechanism coupled to said moving conductor assembly for automatically opening said separable contacts when unlatched, a trip bar for unlatching said latchable operating mechanism when actuated, a thermal magnetic trip mechanism for actuating said trip bar to unlatch the latchable operating mechanism in response to predetermined overcurrent conditions, a shunt lead connected between said moving conductor assembly and said thermal magnetic trip mechanism and looping through said second compartment, and a neutral lead extending through said second compartment; and a drop in modular unit comprising;

a printed circuit board having ground fault detection components and a trip solenoid mounted on a first side;

a toroidal ground fault sensing coil; and a housing having a base and transverse walls extending from said base and forming a cavity with an open face, means mounting said printed circuit board in said open face with said ground fault detection components and trip solenoid contained within said cavity, and an arcuate recess in which said toroidal sensing coil is retained;

said modular unit being insertable into said second compartment with said trip solenoid in position to engage and actuate said trip bar when energized by said ground fault detection components, and said toroidal coil positioned to have said shunt lead and neutral lead pass therethrough.

2. The circuit breaker of claim 1, wherein said housing is molded from a resilient resin with an integral leaf spring which firmly fixes said modular unit within said second compartment with said cover in place on said base of said molded case.

3. The circuit breaker of claim 1, wherein said arcuate recess is formed at least in part by a cantilevered integrally molded finger engaging a peripheral surface of said toroidal coil.

4. The circuit breaker of claim 3, wherein said arcuate recess is also formed in part by an arcuate transverse wall section having an opening between said recess and said cavity, and wherein said toroidal coil has a radially extending boss through which coil leads extend, said boss seating in said opening in said arcuate transverse wall section with said leads extending into said cavity for connection to said ground fault detection components on said printed circuit board.

5. The circuit breaker of claim 4, wherein said opening is substantially diametrically opposite said cantilevered finger and said cantilevered finger has a radially inwardly directed rib which engages said peripheral surface of said toroidal coil.

6. The circuit breaker of claim 4, wherein said housing includes a transverse partition spaced from said arcuate transverse wall section forming therebetween a wiring channel.

7. The circuit breaker of claim 1, wherein said arcuate recess extends transversely through said housing and encloses more than 180° of said toroidal coil.

8. A molded case circuit breaker with ground fault protection and signaling capability, said circuit breaker comprising:

a molded case having a base with side-by-side first and second compartments and a cover mating with said base and enclosing said first and second compartments;

a pole assembly mounted in said first compartment and comprising separable contacts including a stationary contact and a movable contact, a moving conductor assembly on which said moveable contact is mounted, a latchable spring powered operating mechanism coupled to said moving conductor assembly for automatically opening said separable contacts when unlatched, a trip bar for unlatching said latchable operating mechanism when actuated, a thermal magnetic trip mechanism for actuating said trip bar to unlatch the latchable operating mechanism in response to predetermined overcurrent conditions, a shunt lead connected between said moving conductor assembly and said thermal magnetic trip mechanism and looping through said second compartment, and a neutral lead extending through said second compartment; and a drop in modular unit comprising;

a printed circuit board having ground fault detection components and a trip solenoid mounted on a first side;

a toroidal ground fault sensing coil; and at least one signalling switch; and a housing carrying said printed circuit board with said ground fault detection components and trip solenoid, said toroidal coil and said at least one signalling switch;

said modular unit being insertable into said second compartment with said trip solenoid positioned to engage and actuate said trip bar when said ground fault detection components detect a ground fault, with said toroidal coil positioned for said shunt lead and said neutral lead to pass therethrough, and with said at least one signalling switch positioned to be actuated by said latchable operating mechanism.

9. The circuit breaker of claim 7, wherein said arcuate recess engages more than 180° of a peripheral surface of said toroidal coil.

10. The circuit breaker of claim 8, wherein said housing has a switch recess in an outer surface thereof in which said at least one signaling switch is mounted, said at least one switch having a plunger and said operating mechanism having an actuator selectively engaging said plunger.

11. The circuit breaker of claim 8, wherein said at least one signaling switch comprises a bell alarm switch and an auxiliary switch and wherein said operating mechanism has a bell alarm actuator selectively actuating said bell alarm switch and an auxiliary switch actuator selectively actuating said auxiliary switch.

12. The circuit breaker of claim 8, wherein said housing comprises a base panel, at least partial transverse walls forming a cavity with an open face, means mounting said printed circuit board in said open face with said ground fault detection components and said trip solenoid contained in said cavity, and an arcuate transverse wall forming at least in part said arcuate cavity for retaining said toroidal coil.

13. The circuit breaker of claim 8, wherein said housing has a switch recess in an outer surface thereof and means mounting said at least one signaling switch in said switch recess.

14. A modular unit insertable in a compartment in a molded case circuit breaker, said modular unit comprising:

a printed circuit board having ground fault detection components and a trip solenoid mounted on a first face thereof;

a toroidal sensing coil; and a housing having a base, transverse walls extending transversely from said base and forming a cavity with an open face, means mounting said printed circuit board in said open face with said ground fault detection components and trip solenoid contained within said cavity, and an arcuate recess extending transversely through said housing and in which said toroidal sensing coil is retained.

15. The modular unit of claim 14, wherein said arcuate recess is formed in part by an arcuate transverse wall section having an opening into said cavity, and wherein said toroidal sensing coil has a radially extending boss for coil leads, said boss being seated in said opening with said coil leads extending into said cavity.

16. A modular unit insertable in a compartment in a molded case circuit breaker, said modular unit comprising:

a printed circuit board having ground fault detection components and a trip solenoid mounted on a first face thereof;

a toroidal sensing coil;

a housing having a base, transverse walls extending transversely from said base and forming a cavity with an open face, means mounting said printed circuit board in said open face with said ground fault detection components and trip solenoid contained within said cavity, and an arcuate recess extending transversely through said housing and in which said toroidal sensing coil is retained;

wherein said arcuate recess is formed in part by an arcuate transverse wall section having an opening into said cavity, and wherein said toroidal sensing coil has a radially extending boss for coil leads, said boss being seated in said opening with said coil leads extending into said cavity; and wherein said arcuate recess also being formed in part by a cantilevered finger adjacent said arcuate transverse wall section, said arcuate transverse wall section and said cantilevered finger extending at least 180 around a periphery of said toroidal sensing coil.

* * * * *